United States Patent [19]

Smith

[11] 4,031,297

[45] June 21, 1977

[54] POLYMERIZATION OF MONOMERS

[75] Inventor: Edwin Studley Smith, Cuyahoga Falls, Ohio

[73] Assignee: The Goodyear Tire & Rubber Company, Akron, Ohio

[22] Filed: Aug. 27, 1973

[21] Appl. No.: 391,905

Related U.S. Application Data

[63] Continuation of Ser. No. 281,903, Aug. 18, 1972, which is a continuation of Ser. No. 881,870, Dec. 3, 1969, abandoned, which is a continuation-in-part of Ser. No. 335,413, Jan. 2, 1964, abandoned.

[52] U.S. Cl. .................................. 526/87; 526/321; 526/328; 526/330; 526/343; 526/345

[51] Int. Cl.$^2$ .......................................... C08F 2/02

[58] Field of Search ................ 260/78.5 R, 78.5 E, 260/78.5 CL, 86.3, 85.7, 87.5, 87.7, 95 R

[56] References Cited

UNITED STATES PATENTS

| | | | |
|---|---|---|---|
| 3,051,677 | 8/1962 | Rexford | 260/29.6 |
| 3,230,203 | 1/1966 | Kuhne | 260/78.5 |
| 3,231,534 | 1/1966 | Blades et al. | 260/29.6 |
| 3,251,810 | 5/1966 | Buning | 260/78.5 |

FOREIGN PATENTS OR APPLICATIONS

| | | | |
|---|---|---|---|
| 508,610 | 12/1954 | Canada | 260/78.5 |
| 354,581 | 7/1961 | Switzerland | 260/92.8 |

OTHER PUBLICATIONS

Chemistry of Acrylonitrile, 2nd Ed., 1959, pp. 32–36.

*Primary Examiner*—John Kight, III
*Attorney, Agent, or Firm*—F. W. Brunner; J. M. Wallace, Jr.

[57] ABSTRACT

A constant composition copolymer is automatically made by means of a self-regulating batch process by maintaining the polymerization system at a constant volume throughout the reaction by adding polymerizable monomer in such a manner as to maintain both the unpolymerized monomer in the polymerization mixture at the original composition and the polymerization mixture at the original volume. The process is applicable to any polymerization reaction where a polymer is formed from two or more monomers and where a reduction in the volume of reaction mixture occurs during polymerization.

3 Claims, No Drawings

POLYMERIZATION OF MONOMERS

This is a continuation application of my application Ser. No. 281,903 filed Aug. 18, 1972, which is a continuation application of my application Ser. No. 881,870 filed Dec. 3, 1969 and abandoned Aug. 28, 1972, which is a continuation-in-part application of my application Ser. No. 335,413 filed Jan. 2, 1964 and abandoned Dec. 6, 1969.

This invention relates to the batch polymerization of at least two different monomers in such a way as to produce a polymer of a predetermined composition, and particularly to a method of controlling the composition of the polymer in a completely automatic manner which is simple and fool-proof in its operation.

The combining ratio of any two or more different monomers during their conjoint batch polymerization is determined by calculations based upon the reactivity coefficient of each monomer. When the monomer ratio is kept constant throughout the polymerization by replenishing the more rapidly consumed monomer at a predetermined rate calculated from the reactivity coefficient of the monomers, the polymer will have a uniform average composition. The technic used in the past to bring about this desired uniformity of polymer composition required that the rate of conversion from monomer to polymer be frequently determined during the polymerization. This information was then used to determine the rate at which the various monomers involved in the polymerization had to be added to the polymerization medium. By polymerization medium is meant all liquid and solid phases present in the reactor at any time during polymerization. The rate of addition had to be adjusted continually to compensate for the rate at which conversion took place. Many disadvantages were associated with this type of operation in, for example, the possibility of error in the analysis of the polymerization medium, the time lag resulting from completion of the anaylsis of samples taken for the purpose of determining the conversion rate as well as the change in rate taking place between samples which in turn caused an error to creep into the calculations in regard to the amount of monomer needed in order to adjust the monomer ratio. As a result the composition of the polymer produced under those conditions was not uniform.

When it becomes necessary to carefully control the composition of the polymer, the state of the present art in this regard has no simple and fool-proof method which may be used in an economical and efficient manner.

It has now been discovered that the composition of a polymer made by a batch process may be controlled in a manner which eliminates all of the disadvantages set forth above without the use of expensive equipment or involved procedures. Specifically it has been observed that the volume of a polymerization medium gradually decreases throughout the polymerization reaction as a result of the polymer being formed which is denser than the monomer used in making the polymer and this decrease in volume is directly proportional to the conversion. Having made this observation, it was then discovered that a predetermined range of composition is insured by continuously adding the consumed monomers in a ratio calculated from their combining ratio so as to maintain the volume of polymerization medium constant. Having made this further observation, the means for measuring the volume reduction of the polymerization medium can be any of those well known in the technology of chemical engineering operations. For example, since it is now discovered that the composition of a polymer may be unerringly controlled by adding monomers in a predetermined calculated ratio to the polymerization medium at a rate to maintain the original volume of the polymerization medium, it now becomes a very simple expedient to merely establish a bench mark indicating the original volume of the polymerization medium and then adding the monomers at a rate to prevent any deviation in volume of the polymerization medium from this established bench mark.

A specific embodiment involving one of the most simple of all bench marks is in the use of the technic of carrying out the reaction in a vessel which is maintained full of the reaction mixture or polymerization medium throughout the reaction period. Another simple expedient involves the use of a sight glass column maintained outside of the reaction vessel but constructed to show the exact level of the liquid inside the reactor. A feed mechanism is then connected to the reaction vessel and the monomers fed into the reaction mixture at a rate to maintain a constant level of reactants.

The following example illustrates the principle of this invention wherein the volume of the polymerization medium is kept constant by insuring that the reaction vessel remain full of reactant during the polymerization period. All parts are by weight unless otherwise indicated.

EXAMPLE 1

A reactor is charged with 100 lbs. of monomer in which the monomer ratio is 98.923 percent vinyl chloride and 1.077 percent vinylidene chloride. The instantaneous copolymer forming from this monomer composition is known to be 96.5 percent vinyl chloride and 3.5 percent vinylidene chloride. The reactor is then filled with water at the start of the reaction and maintained full with a monomer blend consisting of 92.095 percent of vinyl chloride and 7.905 percent of vinylidene chloride pressured into the reactor at a pressure approximately 20 lbs. higher than the reaction pressure. The shrinkage in volume is equivalent to 55 lbs. of additional monomer added during polymerization. At 100 percent conversion there is in the reactor a copolymer of 98.923 lbs. of vinyl chloride and 1.077 lbs. of vinylidene chloride as originally charged and 50.650 lbs. of vinyl chloride and 4.348 lbs. of vinylidene chloride introduced during polymerization making a total of 149.575 lbs. of vinyl chloride and 5.425 lbs. of vinylidene chloride in the copolymer. This results in a copolymer of a composition of 96.5 percent vinyl chloride and 3.5 percent vinylidene chloride at 100 percent conversion as well as at the beginning of the reaction, and since the addition of the monomer is proportional to the conversion at all times, the composition of the polymer forming throughout the reaction is 96.5 percent vinyl chloride and 3.5 percent vinylidene chloride.

A constant composition copolymer is thus made by the simple expedient of adding a comonomer mixture to a polymerization reaction at a rate sufficient to maintain the volume of the polymerization medium constant throughout the reaction. The ratio of the monomers in the original charge and the ratio of the monomers during the continuous addition can be calculated from the reactivity ratios of the monomers and the known desired composition of the desired copolymer.

The process of this invention is applicable to any batch polymerization reaction where a polymer is formed from the reaction of two or more monomers and where a reduction in the volume of the reaction mixture gradually occurs as the polymerization proceeds.

Two or more monomers that may be used in making a polymer by means of the process of this invention may be selected from the group of vinyl esters including the alkyl acrylates such as methyl acrylate, the alkyl maleates such as methyl maleate, the alkyl fumarates such as ethyl fumarate, the vinyl ethers such as methyl vinyl ether, the alkyl methacrylates such as ethyl methacrylate and the alkyl itaconates such as ethyl itaconate. Collectively the monomers usefully polymerized by the process of this invention may be represented as being a monomer containing a terminal vinylidene group having the structural formula $CH_2 = C <$ where at least one of the disconnected valences is attached to an electronegative radical such as phenyl, acetoxy, carboxy, carbonitrile and halogen, examples of the monomers being those hereinbefore listed as well as styrene, vinylnaphthalene, alphamethylstyrene, dichlorostyrenes, alpha-methylene carboxylic acids, their esters, nitriles and amides including acrylic acid, acrylonitrile, acrylamide; the vinyl esters of alkanoic acids including vinyl formate, vinyl acetate, vinyl propionate, vinyl butyrate, vinyl pyridine; the alkyl vinyl ketones including methyl vinyl ketone; the conjugated diolefines including butadiene-1,3; isoprenes chloroprene, piperylene and 2,3-dimethyl-butadiene-1,3. The following table of examples shows what monomer composition in the original charge and in the monomers continuously added to keep the volume constant is necessary in order to give the copolymer composition or range of compositions desired.

TABLE I

| Example | Desired Copolymer Composition or Range of Composition | Monomer Composition in Original Charge | Monomer Composition Added Continuously to Keep Volume Constant |
|---|---|---|---|
| 2 | 95/5 Vinyl chloride/ diethyl maleate | 96.5/3.5 | 92.3/7.7 |
| 3 | 95/5 vinyl chloride/ diethyl fumarate | 99.5/0.5 | 86.8/13.2 |
| 4 | 73.1/26.9 vinyl chloride/ ethyl acrylate | 98.4/1.6 | 27.1/72.9 |
| 5* | 96/4 vinyl chloride/ vinyl acetate | 93.25/6.75 | 101.3/0.0 |
| 6 | 96/4 to 94/6 vinyl chloride/ vinyl acetate | 93.25/6.75 | 95.36/4.64 |
| 7* | 62.8/37.2 vinyl acetate/ethyl acrylate | 94.2/5.8 | 0/149 |
| 8 | 62.8/37.2 to 73.6/26.4 vinyl acetate/ethyl acrylate | 94.2/5.8 | 0/100 |

*Examples 5 and 7 represent impossible situations wherein more than a maximum of 100 parts of monomer must be added continuously in order to satisfy the combining rate of vinyl chloride in Example 5 and of ethyl acrylate in Example 7. However, a controlled composition of these copolymers may be made as shown in Examples 6 and 8 having a predetermined range of average composition between a preselected upper and lower limit.

While certain representative embodiments and details have been shown for purpose of illustrating the invention, it will be apparent to those skilled in this art that various changes and modifications may be made therein without departing from the spirit or scope of the invention.

What is claimed is:

1. In a batch polymerization process for making a copolymer of uniform composition wherein a liquid mixture of polymerizable monomers is added to a reactor and a polymerization reaction commenced to form an initial volume of a polymerization medium comprised of (1) a liquid phase of the mixture of polymerizable monomers and (2) a solid phase of copolymer product and wherein the initial volume of the polymerization medium gradually decreases during the course of the polymerization reaction due to the copolymer being formed having a greater density than the polymerizable monomers being consumed, resulting in a final copolymer product of nonuniform composition, the improvement consisting of maintaining said initial volume of the polymerization medium constant throughout the polymerization reaction by continuously adding additional polymerizable monomers at that rate necessary to maintain said volume constant and in a ratio necessary to produce the desired copolymer of uniform composition.

2. The method of claim 1 wherein the monomers are methylene compounds containing a vinylidene radical having the structural formula $CH_2 = C <$, two or more of which monomers are present in the polymerization system.

3. The method of claim 1 in which the volume of the polymerization system is regulated by starting the polymerization in the system at full reactor capacity and maintaining the reactor full throughout the polymerization reaction.

* * * * *